United States Patent Office 3,657,192
Patented Apr. 18, 1972

---

3,657,192
STERICALLY HINDERED SECONDARY DIAMINE CURING AGENTS FOR POLYURETHANE COMPOSITIONS
Walter F. Schulz, Joliet, Ill., and Herwart C. Vogt, Grosse Ile, Mich., assignors to BASF Wyandotte Corporation, Wyandotte, Mich.
No Drawing. Continuation-in-part of application Ser. No. 699,319, Jan. 22, 1968. This application Aug. 24, 1970, Ser. No. 66,404
Int. Cl. C08g 22/00
U.S. Cl. 260—77.5 AM
7 Claims

ABSTRACT OF THE DISCLOSURE

Sterically hindered heterocyclic secondary diamines prepared by the reaction of mesityl oxide with a vicinal diamine and corresponding to the formula:

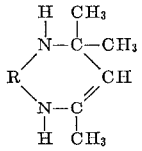

wherein R is the alkylene, cycloalkylene or arylene, organic residue of the vicinal diamine are used as chain extender for urethane urea polymers to provide products with improved properties and pot life.

---

This application is a continuation-in-part of copending U.S. patent application Ser. No. 699,319, filed Jan. 22, 1968, and entitled, "Sterically Hindered Secondary Diamine Curing Agents" now abandoned.

The invention relates to the curing of urethanes and to methods for their preparation. It is more particularly concerned with the curing of urethane polymers with sterically hindered secondary diamines.

Secondary diamines are known in the art as curing agents for polyurethanes. However, the diamines presently used react rapidly with prepolymers leading to short pot life which prevents adequate mixing and formulating times, thereby resulting in the formation of polyurethanes and epoxy resins often having undesirable properties. For application where longer pot life is desired, a slow reacting diamine for curing is necessary. The term "pot life" as used herein is defined as the working life or the period of time during which a liquid resin, after mixing with a catalyst, curing agent, chain extender, solvent, or other compounding ingredients, remains usable.

It is an object of the present invention to prepare urethane-urea polymers utilizing sterically hindered secondary diamine curing agents. It is an additional object to provide a process for preparing urethane-urea polymers in which novel sterically hindered secondary diamine curing agents are used. It is a further object to provide a diamine which, when reacted with polyurethanes gives longer pot life. Other objects and advantages of this invention will become apparent to those skilled in the art upon consideration of the accompanying disclosure.

According to the invention, urethane-urea polymers are prepared by the cross-linking or chain extension of isocyanate-terminated prepolymer, with a sterically hindered secondary diamine. The sterically hindered secondary diamines are prepared from the reaction of a vicinal diamine, such as o-phenylene diamine, with mesityl oxide, and correspond to the formula:

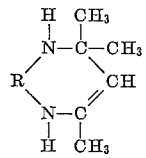

wherein R is the organic residue of the vicinal diamine and may be either alkylene, cycloalkylene, or arylene. The reaction is preferably carried out in the presence of organic solvent media. However, it is to be understood that the reaction can be conducted in the absence of a solvent. The reaction can be performed in a vessel equipped with a reflux condenser, thermometer and stirrer. The resulting sterically hindered secondary diamine is soluble in the selected organic solvent media. The resulting diamine may then be employed as a chain extender for a urethane prepolymer. Chain extending may be accomplished either with or without the use of an organic solvent. The diamine adduct of the mesityl oxide and vicinal diamine reaction when compared with other secondary diamines disclosed in the prior art was found to give an extended pot life.

An inert hydrocarbon solvent can be utilized in the practice of this invention. The amount of solvent used is that which is sufficient to provide a suitable reaction medium. Examples of suitable solvents include aliphatic hydrocarbons, such as hexane, heptane, isoheptane, and aromatic hydrocarbons, such as benzene, toluene, xylene, and the like.

Among the suitable vicinal diamines useful in the present invention are those derived from 1,2-diaminobenzene, such as o-phenylene diamine, 2,3-diaminotoluene, 3,4-diaminotoluene, 1,2-diaminonaphthalene, 2,3-diaminonaphthalene, 3,4-diaminonaphthalene, and the like. It is also within the scope of the invention to use the hydrogenated products of these vicinal diamines. Examples of such products include 1,2-diaminobicyclo[4.4.0]decane, and the like.

Other suitable vicinal diamines are the alkylene diamines, such as ethylene diamine, propylene diamine, and the like. Among the cycloalkylene vicinal diamines contemplated herein is, for example, 1,2-cyclohexylene diamine, 1,2-cyclopentylene diamine, and the like.

In the practice of the present invention it is preferred to employ the above-described aromatic vicinal diamines.

The isocyanate-terminated prepolymers which may be used in this invention are those prepared from the reaction of a polymeric glycol having a molecular weight of at least 750 with a molar excess of an organic polyisocyanate. Aromatic aliphatic and cycloaliphatic diisocyanate and combinations of these types are particularly useful. Examples of the more common diisocyanates are tetramethylene diisocyanate, hexamethylene diisocyanate, toluene diisocyanate, 4,4'-diphenyl methane diisocyanate and 1,5-naphthalene diisocyanate. Other representative organic diisocyanates include polyisocyanates disclosed in U.S. Pat. Nos. 2,292,443; 2,683,730; and 2,929,794. Mixtures of two or more of any of the organic polyisocyanates can be employed.

The polymeric glycols which are reacted with a molar excess of an organic diisocyanate so as to prepare the urethane-urea prepolymers used in the present invention are those glycols having the general formula $H(OR)_xOH$, wherein R is an alkylene radical and $x$ is an integer such that the molecular weight of the glycol will be at least 750. They may be prepared by the polymerization of cyclic ethers, such as ethylene oxide, propylene oxide, dioxolane or tetrahydrofuran. Other glycols which may be used in the present invention are the polyalkylene ether-thioether glycols which are prepared by condensing together various glycols, such as thiodiglycol, and the polyalkylene-arylene ether glycols prepared by reaction of a cyclic ether, such as ethylene oxide, with an arylene glycol. The molecular weight of these glycols will be at least 750.

The term "sterically hindered secondary diamine" as used herein refers to diamines of decreased reactivity towards the isocyanate reaction primarily because of steric factors. In other words, bulky alkyl groups shield the isocyanate groups from reacting with the amine groups of the secondary diamine. An example of one such sterically hindered secondary diamine, where R is phenylene, namely, 5,7,7-trimethyl-2,3-benzo-1, 4-diazacycloheptadiene, which is prepared from 1,2-diaminobenzene and mesityl oxide is illustrated structurally as follows:

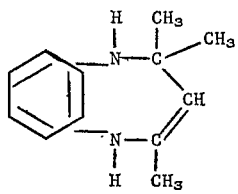

In the above compound the bulky methyl groups at positions 5,7, and 7 tend to shield the amine groups from reaction with isocyanate groups. The diamines of this invention are to be distinguished from "chemically hindered diamines" which have one or more negative substituents, such as halogen or nitro groups juxtaposed to the amine group.

In accordance with this invention, an isocyanate-terminated polyurethane prepolymer is mixed at about room temperature with a sterically hindered secondary diamine curing agent. The proportions of curing agent to prepolymer vary from about 4 to 12 parts by weight of diamine to 100 parts by weight of the urethane prepolymer. The diamine and prepolymer are then stirred and deaerated at from about 70° C. to 120° C. for about 4 to 12 minutes, poured into an open, hot mold and cured therein for about 6 to 18 hours with a temperature range of from about 80 to 150° C.

The following examples will illustrate the preferred embodiments of the invention but are not to be considered as being unduly limitative of the invention.

EXAMPLE I

This example illustrates the preparation of a sterically hindered diamine.

A mixture of 273 grams (2.52 moles) of o-phenylene diamine and 381 grams (3.89 moles) of mesityl oxide was refluxed for 2 hours. This mixture was left to stand for 16 hours and then it was filtered. The filtration yielded 394 grams of crude which was subsequently dissolved in 1050 ml. of benzene at 80° C. This solution was left to stand for 18 hours and then it was filtered. The filtration yielded 309 grams of crystals and mother liquor. The crystals were then dissolved in 850 ml. of benzene at 80° C. and the mother liquor was concentrated by boiling. The benzene solution and the concentrated mother liquor yielded 195 grams and 74 grams, respectively, of crystals. These crystals were then crushed, filtered, and washed with benzene and hexane.

The diazacycloheptadiene, identifiable as 5,7,7-trimethyl-2,3-benzo-1,4-diazacycloheptadiene-2,5, melted at 128° C., had 14.8% amine nitrogen and an equivalent weight of 94.

Examples II to VI illustrate the preparation of polyurethanes, utilizing the sterically hindered diamine of Example I.

EXAMPLE II

An isocyanate-terminated prepolymer was prepared by mixing 1 mole of a 700 molecular weight triol based on trimethylolpropane and propylene oxide, 4 moles of a 1300 molecular weight diol based on propylene glycol and propylene oxide, 4 moles of 2000 molecular weight diol based on propylene glycol and propylene oxide, 4 moles of 1,4-butanediol, and 27 moles of toluene diisocyanate. To 100 grams of this prepolymer, which had an equivalent weight of 706, was added 11.9 grams of the sterically hindered diamine of Example I. After the mixture thereby obtained had been stirred and deaerated at 70° C. for 4 minutes, it was poured into an open, hot mold, and cured therein for 12 hours at 100° C. The pot life was found to be 24 minutes at 70 to 75° C. The resulting polyurethane had a Shore A hardness of 65. The Shore A hardness in this and subsequent examples was determined by the method of ASTM-D-2240.

EXAMPLE III

To 100 grams of prepolymer of Example II previously deaerated at 80° C. for 12 minutes was added 11.9 grams of the sterically hindered diamine of Example I. After the mixture thereby obtained had been stirred and deaerated at 80° C. for 5 minutes it was poured into a mold and heated for 12 hours at 100° C. The pot life at 70° C. was 30 minutes. The polyurethane exhibited a Shore A hardness of 55.

EXAMPLE IV

An isocyanate-terminated prepolymer was prepared from 1 mole of a 700 molecular weight trial based on trimethylolpropane and propylene oxide, 8 moles of a 1300 molecular weight diol based on propylene glycol and propylene oxide, and 19 moles of toluene diisocyanate. This prepolymer had an equivalent weight of 758.6.

To 100 grams of the isocyanate-terminated prepolymer was added 8.4 grams of the sterically hindered diamine of Example I. This mixture was stirred and deaerated at 65–70° C. for 3 minutes, poured into an open, hot mold, and cured for 12 hours at 100° C. The pot life of this polyurethane was 5 minutes at 70 to 75° C. The cured polymer had a Shore A hardness of 60.

EXAMPLE V

To 100 grams of the prepolymer of Example IV was added 4.4 grams of the sterically hindered diamine of Example I. This mixture was stirred and deaerated at 80° C. for 5 minutes, poured into an open, hot mold, and cured for 12 hours at 100° C. The pot life of this mixture was 8 minutes at 70 to 85° C. The cured polymer had a Shore A hardness of 58.

EXAMPLE VI

A prepolymer was prepared by mixing 1 mole of a 700 molecular weight triol based on trimethylolpropane and propylene oxide, 7 moles of 1300 molecular weight diol based on propylene glycol and propylene oxide, and 17 moles of toluene diisocyanate. This prepolymer had an equivalent weight of 751.

To 90 grams of this prepolymer was added 7 grams of the sterically hindered diamine of Example I. This mixture was stirred and deaerated at 65° C. for 4 minutes, poured into an open, hot mold, and cured at 12 hours at 100° C. The pot life of this mixture was 6 minutes at 7 to 75° C. The Shore A hardness of the polyurethane was found to be 52.

EXAMPLE VII

This example illustrates the relative reaction rates of the sterically hindered diamine of the present invention when compared with other diamines which are used for cross-linking in polyurethanes.

Equimolar amounts of 4,4'-methylene bis-2-chloroaniline (MBC); 3,3'-dichlorobenzidine (DCB); and 5,7,7-trimethyl - 2,3 - benzo - 1,4 - diazacycloheptadiene - 2,5 (TMBD) were reacted with phenylisocyanate in a dry toluene solvent at 40° C. Samples were withdrawn during the course of these reactions and an infrared spectrophotometer was used to record the concentration of isocyanate remaining, based on the absorbance of the 4.5 NCO band, the absorbance of the solution being determined by using a 0.08 mm. sodium chloride cell. For each reaction, a plot of NCO concentration vs. time was constructed in order to determine the reaction half lives, i.e., the reaction time corresponding to half-depletion of the original concentration of isocyanate present. The following results were obtained.

| Amine reactant: | $\phi$NCO half life, hrs. |
|---|---|
| MBC | 12 |
| DCB | 39 |
| TMBD | 58.5 |

With the exception of the TMBD, the above amines gave insoluble reaction products in the toluene system.

As can be seen from this comparison, the sterically hindered diamine of this invention (TMBD) had a longer reaction half life when compared with chemically hindered diamines.

What is claimed is:

1. A cured polymer which is the reaction product of an isocyanate-terminated prepolymer with a sterically hindered secondary diamine which corresponds to the formula:

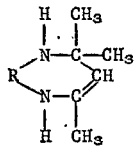

wherein R is an organic residue and which may be either alkylene, cycloalkylene or arylene.

2. The polymer of claim 1 wherein R is selected from the group consisting of ethylene, propylene, cyclohexylene, cyclopentylene, phenylene, tolylene and naphthylene.

3. The polymer of claim 2 wherein R is phenylene.

4. A process for preparing a cured polymer which comprises the steps of:
  (a) stirring and deaerating an NCO-terminated prepolymer with a sterically hindered secondary diamine corresponding to the formula:

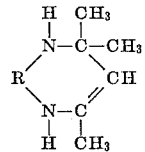

wherein R is an organic residue which is either alkylene, cycloalkylene, or arylene at a temperature of about 70° C. to 120° C., and (b) curing the product of (a) at a temperature ranging from about 80 to 150° C. for a period of about 6 to 18 hours.

5. The process of claim 4 wherein the diamine is present in an amount ranging from about 4 to 12 parts by weight of diamine per 100 parts by weight of prepolymer.

6. The process of claim 5 wherein R is selected from the group consisting of ethylene, propylene, cyclohexylene, cyclopentylene, phenylene, tolylene and naphthylene.

7. The process of claim 6 wherein R is phenylene.

References Cited
UNITED STATES PATENTS

| 3,281,397 | 10/1966 | Axelrod | 260—77.5 |
| 3,401,133 | 9/1968 | Grace et al. | 260—29.2 |

OTHER REFERENCES

Noller, Chemistry of Organic Compounds, W. B. Saunders & Co., Philadelphia, 1951, p. 470.

DONALD E. CZAJA, Primary Examiner

M. J. WELSH, Assistant Examiner